US012110855B1

(12) United States Patent
Lohmann et al.

(10) Patent No.: US 12,110,855 B1
(45) Date of Patent: Oct. 8, 2024

(54) FUEL INJECTOR CLAMP WITH COMPOUND MOUNTING

(71) Applicant: Deere & Company, Moline, IL (US)

(72) Inventors: Craig W. Lohmann, Cedar Falls, IA (US); Rajesh R. Gajare, Pandharpur (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/587,350

(22) Filed: Feb. 26, 2024

(51) Int. Cl.
*F02M 61/14* (2006.01)
*F02M 55/00* (2006.01)
*F02M 55/02* (2006.01)

(52) U.S. Cl.
CPC .......... *F02M 61/14* (2013.01); *F02M 55/004* (2013.01); *F02M 55/025* (2013.01); *F02M 2200/855* (2013.01); *F02M 2200/856* (2013.01); *F02M 2200/857* (2013.01)

(58) Field of Classification Search
CPC .... F02M 61/14; F02M 55/004; F02M 55/025; F02M 2200/855; F02M 2200/856; F02M 2200/857
See application file for complete search history.

(56) References Cited

U.S. PATENT DOCUMENTS 6,745,752 B1 * 6/2004 Jensen ................ B25B 27/0028 24/457
7,334,572 B1 * 2/2008 Diggs ..................... F02F 7/006 123/90.38
10,378,499 B2 * 8/2019 Carlson .................. F02M 61/14
2004/0159311 A1 * 8/2004 Anello ................... F02M 61/14 24/457
2012/0060797 A1 * 3/2012 Engquist ............. C22C 33/0264 123/470
2013/0174810 A1 * 7/2013 Levey .................... F02M 61/14 123/470
2023/0077087 A1 * 3/2023 Bazyn .................... F02M 61/14

OTHER PUBLICATIONS

Wikipedia—Gasoline Direct Injection article, https://en.wikipedia.org/wiki/Gasoline_direct_injection, undated, admitted prior art. (12 pages).

* cited by examiner

*Primary Examiner* — Sizo B Vilakazi
(74) *Attorney, Agent, or Firm* — KLINTWORTH & ROZENBLAT IP LLP

(57) ABSTRACT

A fuel injector clamp has a clamp body extending between a fuel rail side and a cylinder head side. The fuel rail side has a bolt fixing surface extending in a first plane and a rail mounting surface extending in an oblique second plane relative to the first plane. The cylinder head side has a clamp mounting surface extending in a third plane parallel to the first plane. The clamp body defines a first bolt bore, a second bolt bore, and an injector pocket. The first bolt bore extends from the bolt fixing surface at the fuel rail side through the clamp body to the cylinder head side perpendicular to the bolt fixing surface and the clamp mounting surface. The second bolt bore extends from the rail mounting surface at the fuel rail side into the clamp body perpendicular to the rail mounting surface. The injector pocket extends through the clamp mounting surface perpendicularly through the clamp body to the rail mounting surface. The first bolt bore and the injector pocket extend along parallel axes, and the second bolt bore extends along an axis that is oblique to the parallel axes.

20 Claims, 7 Drawing Sheets

FUEL INJECTOR CLAMP WITH COMPOUND MOUNTING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to fuel delivery systems in work vehicles and mounting of fuel injectors in work vehicle engines.

BACKGROUND OF THE DISCLOSURE

Heavy-duty work vehicles, such as those used in the agricultural, construction, forestry, and mining industries, may utilize various power and drive trains to provide tractive power to the ground-engaging wheels or tracks for work vehicle travel and for operation of work vehicle implements performing work operations. Often the power trains include large power plants in the form of internal combustion engines, such as compression-ignition engines (e.g., diesel engines) or spark-ignition engines having a number of piston-cylinder arrangements for controlled combustion of engine block the fuel and initiation of mechanical power. The fuel may be directed-injected into combustion chambers of the piston-cylinder arrangements by fuel injectors that meter a spray of fuel from a fuel rail or manifold. The fuel injectors are mounted in a proper orientation and alignment with respect to a cylinder head (which is mounted to an engine block crankcase) to inject fuel for combustion.

SUMMARY OF THE DISCLOSURE

The disclosure provides fuel injector clamp for a work vehicle fuel delivery system.

In particular, the disclosure provides a fuel injector clamp having clamp body extending between a fuel rail side and a cylinder head side. The fuel rail side has a bolt fixing surface extending in a first plane and a rail mounting surface extending in an oblique second plane relative to the first plane. The cylinder head side has a clamp mounting surface extending in a third plane parallel to the first plane. The clamp body defines a first bolt bore, a second bolt bore, and an injector pocket. The first bolt bore extends from the bolt fixing surface at the fuel rail side through the clamp body to the cylinder head side perpendicular to the bolt fixing surface and the clamp mounting surface. The second bolt bore extends from the rail mounting surface at the fuel rail side into the clamp body perpendicular to the rail mounting surface. The injector pocket extends through the clamp mounting surface perpendicularly through the clamp body 6 to the rail mounting surface. The first bolt bore and the injector pocket extend along parallel axes, and the second bolt bore extends along an axis that is oblique to the parallel axes.

In one or more embodiments, the second bolt bore is a threaded bore, and the first plane and the second plane form an acute angle therebetween.

In one or more additional embodiments, the second bolt bore intersects the clamp mounting surface at the cylinder head side. The cylinder head side includes a flat surface parallel to and offset from the clamp mounting surface and intersected by the injector pocket. The injector pocket has a first diameter at the fuel rail side and a second diameter at the cylinder head side, the second diameter being larger than the first diameter. The fuel rail side defines an annular seal recess about the injector pocket. The injector pocket has an intermediate transition region between the fuel rail side and the cylinder head side that has a frusto-conical configuration. The injector pocket has a first annular section of cylindrical configuration and a second annular section of cylindrical configuration. The transition region extends from the first annular section to the second annular section.

In other aspect, the disclosure provides a fuel injection assembly for an engine of a work vehicle. The assembly includes a fuel rail having an inlet port, an injection port, and a fuel channel for delivering fuel from the inlet port to the injection port. The assembly also includes a fuel injector having a spray nozzle and a fuel injector clamp configured to couple the fuel rail and the fuel injector together and to a cylinder head of the engine. The fuel injector clamp defines a clamp body having a bolt fixing surface extending in a first plane, a rail mounting surface extending in a second plane that is oblique relative to the first plane, and a clamp mounting surface extending in a third plane parallel to the first plane opposite the rail mounting surface. The clamp body defines a first bolt bore, a second bolt bore, and an injector pocket. The first bolt bore extends from the bolt fixing surface perpendicularly through the clamp body to the clamp mounting surface, the second bolt bore extends from the rail mounting surface perpendicularly into the fuel injector clamp, and the injector pocket extends through the clamp mounting surface perpendicularly through the clamp body to the rail mounting surface. The first bolt bore and the injector pocket extend along parallel axes, and the second bolt bore extends along an axis that is oblique to the parallel axes. The fuel injector clamp couples to the cylinder head via a first bolt extending through the first bolt bore and to the fuel rail via a second bolt extending into the second bolt bore. The fuel injector clamp clamps the fuel injector into and between the injector pocket and an injector cavity of the cylinder head so that fuel from the fuel rail may be sprayed from the spray nozzle.

In yet another aspect, the disclosure provides an engine for a work vehicle having an engine block crankcase and a cylinder head defining a piston cylinder and an injector cavity open to the piston cylinder, and a fuel injection assembly mounted to the cylinder head. The fuel injection assembly includes: a fuel rail having an inlet port, an injection port, and a fuel channel for delivering fuel from the inlet port to the injection port; a fuel injector having a spray nozzle; and a fuel injector clamp configured to couple the fuel rail and the fuel injector together and to the cylinder head. The fuel injector clamp defines a clamp body having a bolt fixing surface extending in a first plane, a rail mounting surface extending in a second plane that is oblique relative to the first plane, and a clamp mounting surface extending in a third plane parallel to the first plane opposite the rail mounting surface. The clamp body defines a first bolt bore, a second bolt bore, and an injector pocket. The first bolt bore extends from the bolt fixing surface perpendicularly through the clamp body to the clamp mounting surface, the second bolt bore extends from the rail mounting surface perpendicularly into the fuel injector clamp, and the injector pocket extends through the clamp mounting surface perpendicularly through the clamp body to the rail mounting surface. The first bolt bore and the injector pocket extend along parallel axes, and the second bolt bore extends along an axis that is oblique to the parallel axes. The fuel injector clamp couples to the cylinder head via a first bolt extending through the first bolt bore and to the fuel rail via a second bolt extending into the second bolt bore. The fuel injector clamp clamps the fuel injector into and between the injector pocket and the injector cavity of the cylinder head so that fuel from the fuel rail may be sprayed from the spray nozzle into the piston cylinder.

One or more of the additional aspects or embodiments of the fuel injector clamp stated above may be incorporated into the fuel injection assembly or the engine.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
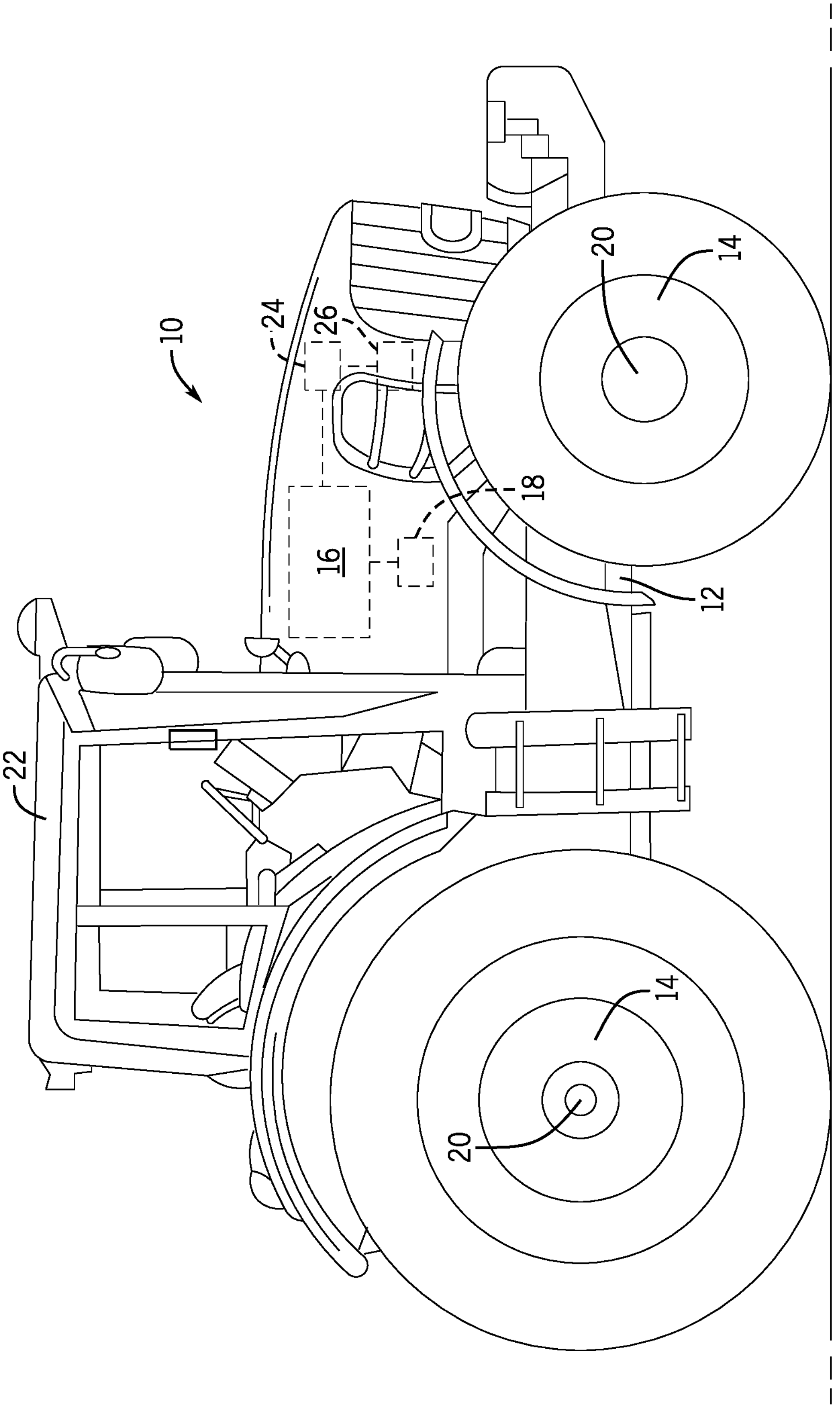
FIG. 1 is an example work vehicle in the form of an agricultural tractor incorporating an engine with a fuel injection assembly having a fuel injector clamp according to the present disclosure.

The following describes one or more example embodiments of the disclosed fuel injector clamp, fuel injection assembly, and engine, as shown in the accompanying figures of the drawings described briefly above. Various modifications to the example embodiments may be contemplated by one of skill in the art. Discussion herein focuses on the fuel injector clamp, the fuel injection assembly, and the engine in the context of a work vehicle, such as an agricultural tractor. However, it should be understood that they may be utilized in other contexts, including other work vehicle platforms in the agriculture, construction, forestry, mining, and other industries.

Overview

As noted above, many current work vehicles have power trains with internal combustion engines, either with compression ignition (e.g., diesel) or spark ignition (e.g., gasoline). These engines may utilize fuel injectors for direct injection into the combustion chambers of the piston cylinders, and in spark-ignition engines may be referred to as GDIs (gasoline direct injectors). Typically, such fuel injectors are assembled onto a fuel rail and the entire fuel injection assembly is installed onto the cylinder head at the top of the engine block crankcase, often using a single angle installation method in which the fastening bolts for mounting the fuel injection assembly to the cylinder head are parallel to the fuel injectors and perpendicular to the fuel rail. Depending on the engine design, however, such an installation method may create manufacturing complexities. For instance, the bolt hole patterns for mounting the cylinder head to the engine block crankcase may interfere with or reduce the material available for the bolts mounting the fuel injection assembly to the cylinder head. As one example, single angle mounting may work well for engines that have a four bolt per cylinder bolt pattern, but may not work for engines that have a six bolt per cylinder bolt pattern, the latter being common in heavy-duty engines used in work vehicles that have larger cylinder bore diameters. When evenly spaced around the cylinders, the additional bolt holes may interfere with bolts for mounting the fuel injection assembly arranged at a side of the engine and oriented at a single angle.

The present disclosure facilitates mounting of the fuel injection assembly in various engine designs (e.g., four, six and other cylinder head bolt patterns) by providing compound angle mounting in which the fastening bolts for mounting the fuel injection assembly are parallel to the fuel injectors but at a non-perpendicular angle with respect to the fuel rail. An additional set of fastening bolts are used to couple the fuel rail to the fuel injectors and the additional fastening bolts are perpendicular to the fuel rail and non-perpendicular and non-parallel, that is, at an oblique angle, with respect to the fuel injectors and the other set of fastening bolts.

In certain embodiments, each fuel injector has a corresponding pair of fastening bolts, one mounting the fuel injector to the fuel rail and one mounting the fuel injector (and the fuel rail) to the cylinder head. The two bolts and the fuel injector may intersect a common upright (possibly vertical) plane, with the centerlines of the fuel injector and the fastening bolt mounting the fuel injector to the cylinder head lying within that common plane while the fastening bolt mounting the fuel injector to the fuel rail only intersects that common plane (i.e., its centerline does not lie within the common plane).

In these and other embodiments, the fuel injection assembly includes an injector clamp that provides the compound angle mounting surfaces that couple the fuel injector to the fuel rail and couple the fuel injector and the fuel rail to the cylinder head. The fuel injector clamp may have a clamp body extending between a fuel rail side and a cylinder head side. The fuel rail side has a bolt fixing surface extending in a first plane and a rail mounting surface extending in an oblique plane relative to the first plane. The cylinder head side has a clamp mounting surface extending in a third plane parallel to the first plane. The clamp body defines a first bolt bore, a second bolt bore, and an injector pocket. The first bolt bore extends from the bolt fixing surface at the fuel rail side through the clamp body to the cylinder head side perpendicular to the bolt fixing surface and the clamp mounting surface. The second bolt bore extends from the rail mounting surface at the fuel rail side into the clamp body perpendicular to the rail mounting surface. The injector pocket extends through the clamp mounting surface perpendicularly through the clamp body to the rail mounting surface. The first bolt bore and the injector pocket extend along parallel axes, and the second bolt bore extends along an axis that is oblique to the parallel axes.

In one or more additional embodiments, the second bolt bore may be a threaded bore, and the first plane and the second plane form an acute angle therebetween. The second bolt bore intersect the clamp mounting surface at the cylinder head side. The cylinder head side includes a flat surface parallel to and offset from the clamp mounting surface and intersected by the injector pocket. The injector pocket has a first diameter at the fuel rail side and a second diameter at the cylinder head side, the second diameter being larger than the first diameter. The fuel rail side defines an annular seal recess about the injector pocket. The injector pocket has an intermediate transition region between the fuel rail side and the cylinder head side that has a frustoconical configuration. The injector pocket has a first annular section of cylindrical configuration and a second annular section of cylindrical configuration. The transition region extends from the first annular section to the second annular section.

These and other aspects of the disclosed injector clamp, fuel injection assembly, and engine will be better understood with regard to the examples that will now be described.

Example Engine Having a Fuel Injection Assembly with Compound Angle Fuel Injector Clamp Referring to FIG. 1, a work vehicle 10 may be implemented as an agricultural tractor or any other heavy-duty work vehicle used in the agricultural, construction, forestry, mining, and other industries. The work vehicle 10 includes a chassis 12 mounting a plurality of ground-engaging members 14, such as wheels or tracks, supporting the chassis 12 off the ground. The chassis 12 carries the power and drive lines of the work vehicle 10 which may include an engine 16 that provides rotational mechanical power to the ground-engaging members 14 through a transmission 18 and front and rear drive axles 20. The chassis 12 also carries an operator cabin 22 to be occupied by an operator of the work vehicle 10. It should be understood that the present disclosure may also pertain to autonomous work vehicles, in which case the operator cabin may be omitted.

The engine 16 may be an internal combustion engine suitable for providing tractive and operational power to the work vehicle 10. In the example implementations described herein, the engine 16 is a spark-ignition gasoline-fueled internal combustion engine; however, the disclosure can be utilized for other engines, including, for example, compression-ignition, diesel-fueled engines. The engine 16 supplies power to the work vehicle 10 either alone or as part of a hybrid power system in which power from the engine 16 is supplemented or replaced during certain operational modes by one or more electric machines, fuel cells or other power sources. Rotation of the ground-engaging members 14 may be slowed, in a controlled manner, utilizing a number of brake mechanisms, such as various wet, hydraulically-controlled friction brake mechanisms (not shown) in accordance with operator input (e.g., depression of a brake pedal).

In addition to providing tractive power to propel the work vehicle 10, the engine 16 may provide power to various onboard subsystems, including various electrical and hydraulic components of the work vehicle 10, and for off-boarding power to other sub-systems remote from the work vehicle 10. For example, the engine 16 may provide mechanical power that is converted to an electric format to run electronics of a control system 24 and electric drives of the work vehicle 10. The engine 16 may also provide mechanical power that is converted to hydraulic format to power various pumps and compressors that pressurize fluid to drive various actuators of a hydraulic system 26 in order to power various drives, actuators, steering components, and work implements onboard the work vehicle 10. The hydraulic system 26 may include various components (e.g., valves, flow lines, pistons/cylinders, seals/gaskets, and so on), such that hydraulic control of vehicle devices may be effected.

The control system 24 may include a processing subsystem and various sensors that may form data connections by signal communication lines, which may represent wireless connections, wired connections, or a combination thereof. The sensors can include any number and variety of onboard or remote sensors, including various sensors to sense engine speed, engine emissions, air and fuel flow, axle and wheel speed, hydraulic pressure, and other attributes (e.g., temperature, torque, etc.) of the work vehicle 10 or a subsystem thereof for monitoring various operational parameters, conditions, and states of the work vehicle 10. The processing subsystem may broadly refer to the processing components of the control system that cooperate to carry-out the processing and control functions described herein. The processing subsystem can encompass or may be associated with any practical number of processors (central and graphical processing units), onboard control computers, controllers (e.g., engine controllers), navigational equipment pieces, computer-readable memories, power supplies, storage devices, interface cards, and other standardized components. Additionally, the processing subsystem may include or cooperate with any number of firmware and software programs or computer-readable instructions designed to carry-out any pertinent process tasks, calculations, and control/display functions. The computer-readable instructions executed by the processing subsystem may be stored within a non-volatile sector of a computer-readable memory further included in the control system. The computer-readable memory can encompass any number and type of storage media suitable for storing computer-readable code or instructions, as well as other data utilized to support the control system 24 perform various control operations (e.g., engine and fuel control). This may include any of various empirical data stores, as well as algorithms, functions, look-up tables, or other data structures utilized to convert units or transform parameters into different parameters. Additionally, in instances in which the control system 24 carries-out certain prescribed actions, the computer-readable instructions stored in the memory may specify the manner in which to perform such actions.

One or more of the electronic control units may receive data from, and transmit data to, various other components onboard the work vehicle 10, including, for example, a GPS unit, the computer-readable memory, the onboard sensors, a display or input device in the operator cabin 22, and a wireless network interface. The wireless network interface can include a communications circuit or module and an antenna which interfaces with a communications network that broadly encompasses any number and type of networks, systems, or architectures for transmitting data between the work vehicle 10 and a remote operations data center. Accordingly, the communications network can include one or more open content delivery networks, Virtual Private Networks (VPNs), the Internet, cellular networks, and other communications networks implemented in accordance with transmission control protocol/Internet protocol (TCP/IP) architectures or other conventional protocols. In various embodiments, the network may further encompass one or more Local Area Networks (LANs), wide area networks (WANs), controller area networks (CANs), and similar wireless networks. In such instances, the control system 24 may selectively transmit data to the remote operations data center to allow remote diagnostic or prognostic monitoring of the operational conditions of the systems onboard the work vehicle 10. Visual notifications or recommendations can be generated on the display device onboard the work vehicle 10 (e.g., in the operator cabin 22) or remote from the work vehicle 10 (e.g., on a display located at the remote operations data center or on a personal display device, such as a laptop, tablet, or smartphone). Note that such personal display devices may also be capable of communicating with the data center or the control system 24 over the communications network. In such embodiments, the visual notifications can further be generated on the personal display device in addition to the notifications generated on the in-cabin display and the data center display. Moreover, certain processing tasks may be performed offboard the work vehicle 10, such as at one or more servers associated with the remote operations data center or otherwise in communication with the control system 24 over the network.

Figure 2:
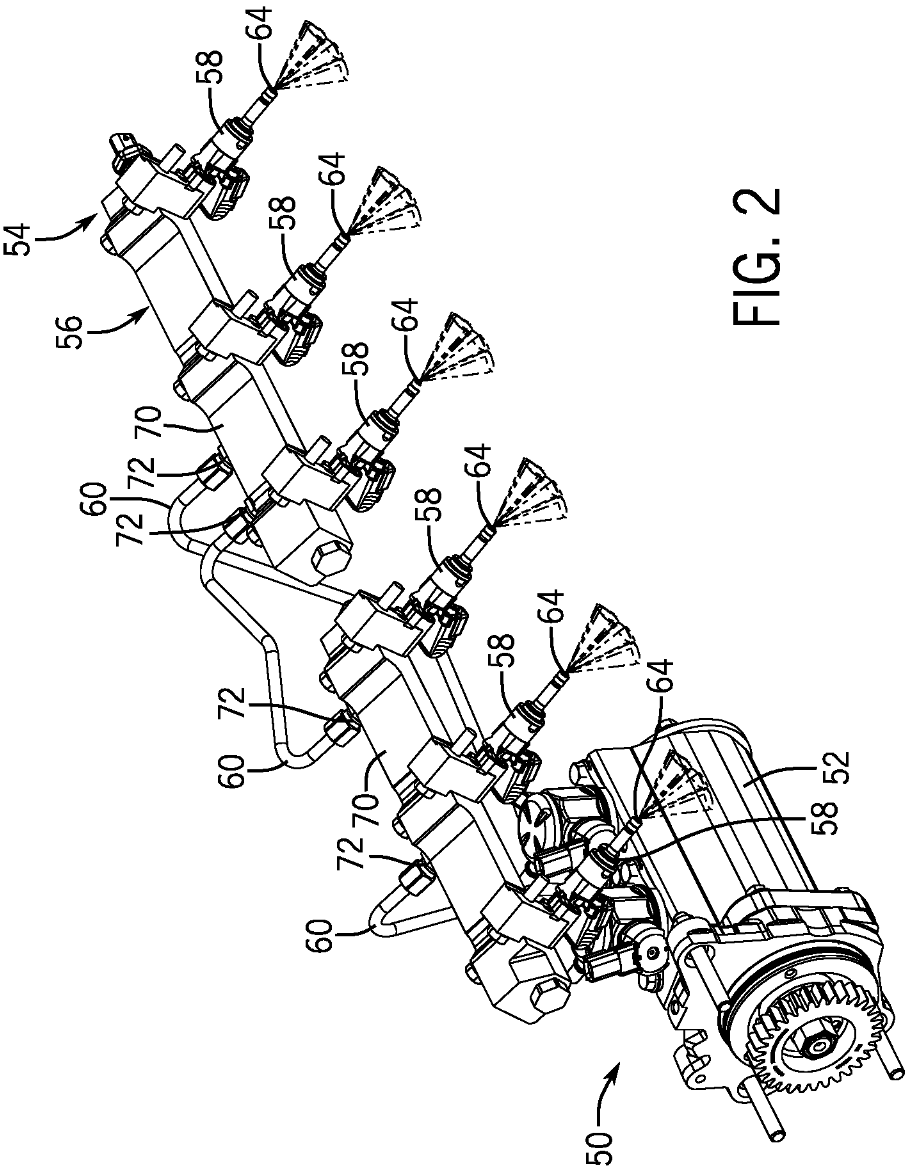
FIG. 2 is a perspective view of an example fuel injection assembly according to the present disclosure.
Figure 3:
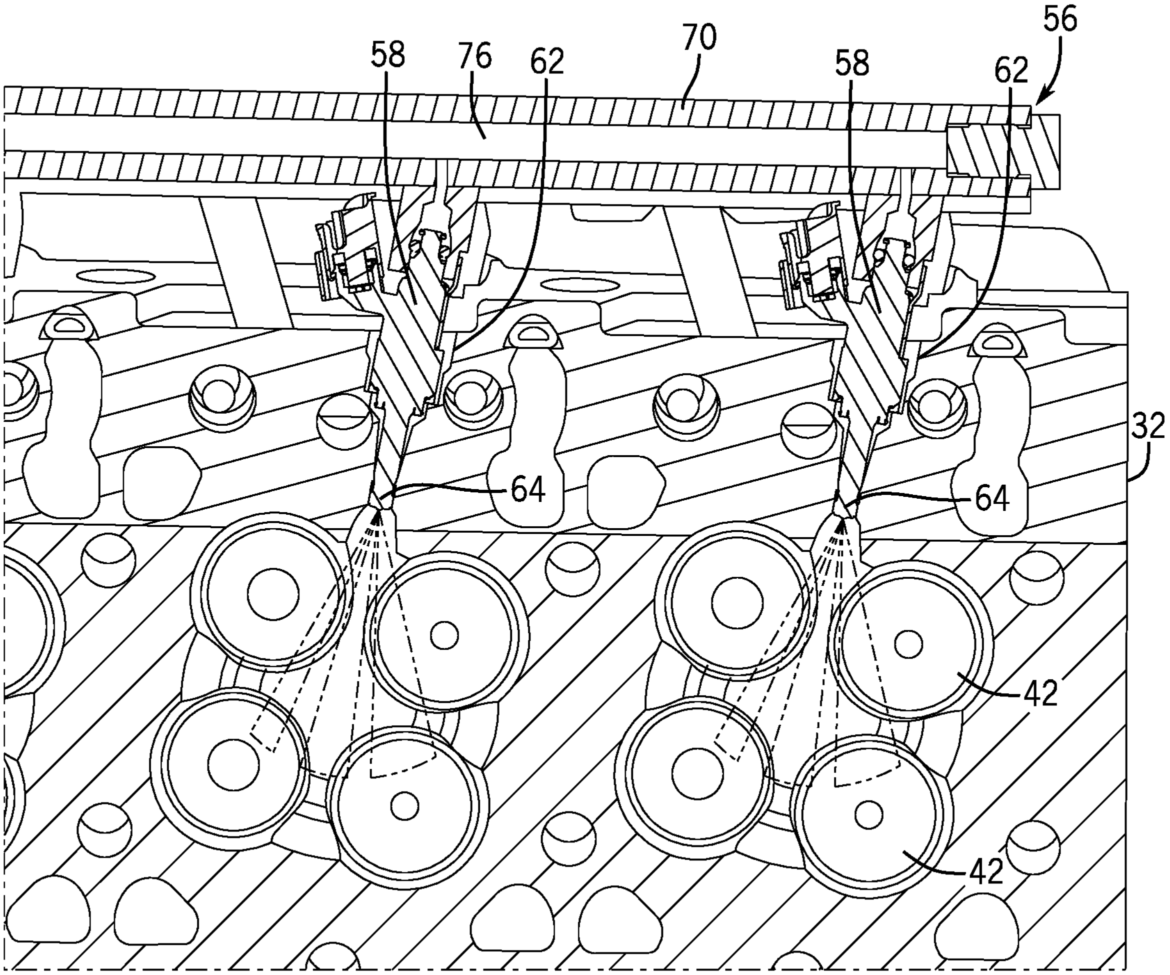
FIG. 3 is a partial sectional view of a portion of the engine and fuel injection assembly.
Figure 4:
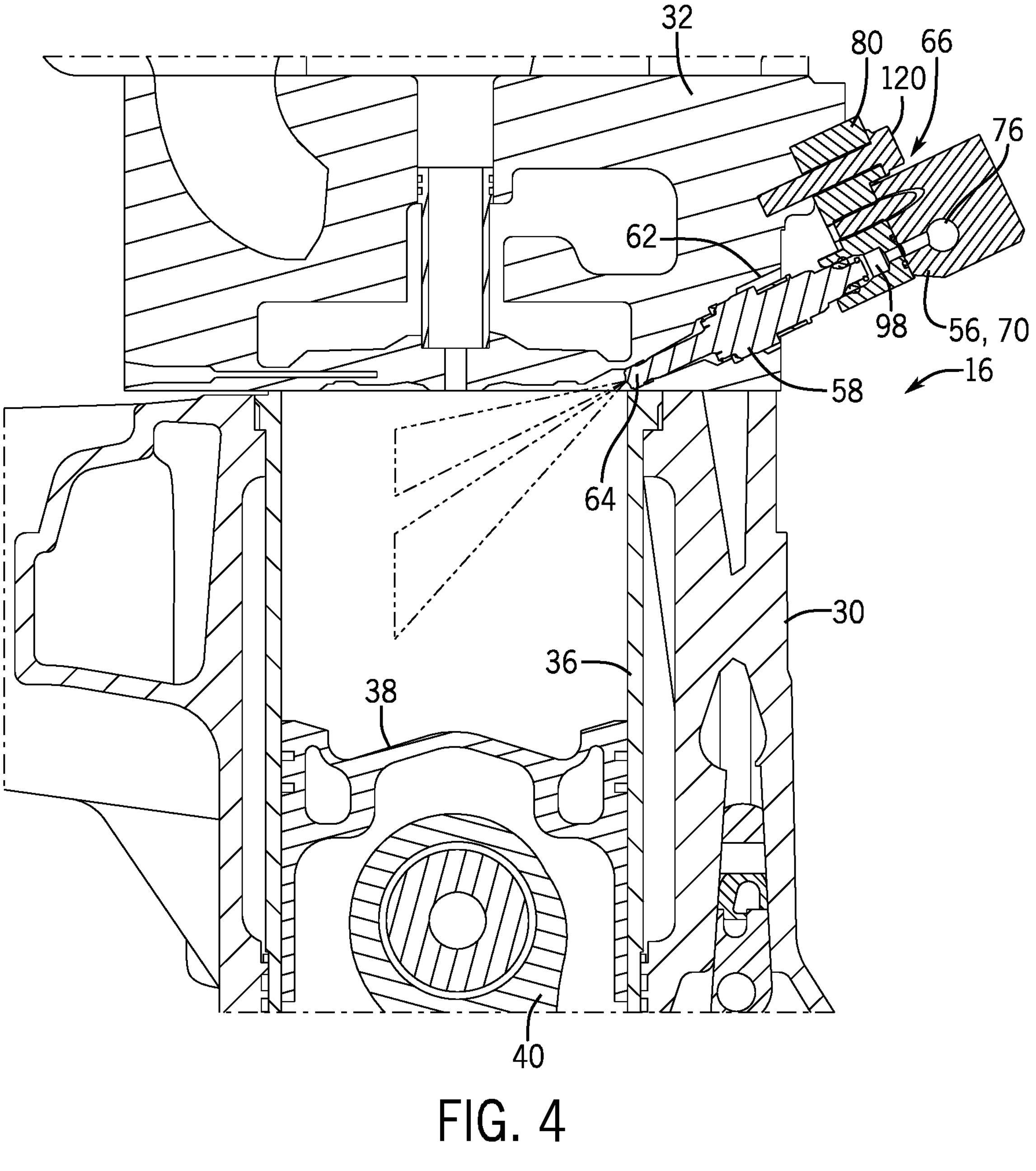
FIG. 4 is another partial sectional view thereof.
Figure 5:
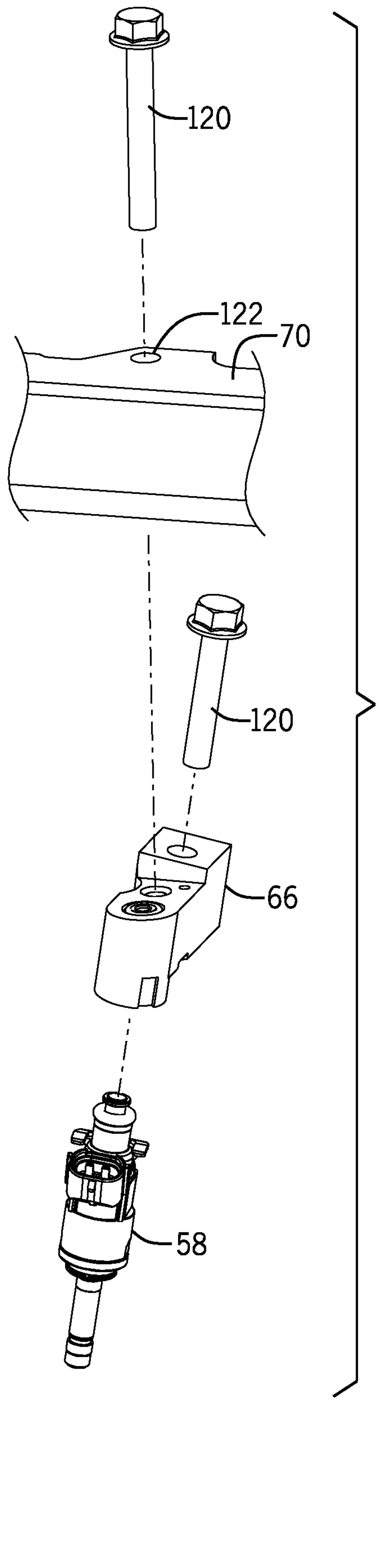
FIG. 5 is an exploded partial assembly view showing an example fuel injector clamp and fuel injector.

Referring also to FIGS. 2-4, the engine 16 includes an engine block crankcase 30, a cylinder head 32 having a valve train and mounted on the engine block crankcase 30 to at least partially enclose piston cylinders 36 defined by the engine block crankcase 30 in which pistons 38 are disposed to reciprocate. Each piston 38 reciprocates within the associated cylinder 36 between a top dead center and a bottom dead center to reduce or enlarge the effective size of a combustion chamber within each cylinder 36. By way of example only, the engine 16 may be a four-stroke, inline, single camshaft, six-cylinder spark ignition engine with a conventional intake stroke, compression stroke, expansion or power stroke, and exhaust stroke in succession.

The valve train has a crank shaft (not shown) rotatably coupled to the engine block crankcase 30 and connected to the pistons 38 by crank members (e.g., crank arms and connecting rods). The reciprocating motion of the pistons 38 within the cylinders 36 rotates the crankshaft to output power to the work vehicle 10. The engine is operable in a positive power condition in which the engine 16 drives the crankshaft to rotate (e.g., applies torque to the crankshaft in one clock direction), and may be operable in a negative power condition, in which the engine resists the rotation of the crankshaft and acts as a brake (e.g., applies torque to the crankshaft in an opposite clock direction). The positive power condition of the engine generally corresponds with combustion cycle operation, while the negative power condition generally corresponds with compression release engine braking operation.

The valve train is configured to selectively open and close pairs of intake and exhaust cylinder valves 42 in communication with each cylinder 36. The cylinder head 32 defines corresponding intake and exhaust openings with valve seats (not shown) extending between and in fluid communication with respective intake and exhaust manifolds (not shown) and each cylinder 36. As will be understood, and not shown in the drawings, the valvetrain has a camshaft with intake and exhaust cam lobes formed by eccentric features, ramps, or various other cam surface profiles of the camshaft. The profiles, the clock position, or both, of the intake and exhaust cam lobes may be spaced apart axially along the camshaft and in different angular orientations such that as the camshaft is rotated the cam lobes contact and drive valve actuators to seat and unseat the cylinder valves at different times. The valve actuators may be various follower mechanisms, such as rocker arms that are mounted to a rocker shaft by eccentrics. The rocker shaft may be mounted to the cylinder head 32 in a fixed position, and the rocker arms pivot on the eccentrics about the rocker shaft so that the distal ends of the rocker arms carrying valve stems/lift rods follow an eccentric path as the valves are seated and unseated at the proper time during the combustion cycle. Rollers at the opposite ends of the rocker arms come in contact with and follow the cam lobes intermittently during various portions of the combustion cycle that effect and effect the pivotal movement of the rocker arms and thereby the seating and unseating of the valves 42. This pivotal movement of the rocker arms and the seating and unseating of the valves 42 occurs rapidly in repetition at precise times of the combustion cycle and varies in rate depending on the commanded speed and operating state of the engine 16.

In normal operation of the engine 16, the camshaft rotates and the cam lobes engage with the rollers on the rocker arms that are associated with the intake valves, which are thereby lifted from their seats. The cam lobes do not cause the rocker arms associated with the exhaust valves to pivot at this rotational position of the camshaft such that the exhaust valves remain seated. During the intake stroke, the pistons 38 are moved downward creating a partial vacuum that draws a fuel/air mixture (or air alone) through the intake valve openings and into the combustion chambers. Once the camshaft rotates such that the cam lobes no longer engage with the rollers on the intake rocker arms sufficiently to effect pivoting, springs cause the intake valves to move upward and reseat onto their seats. During the compression stroke, the fuel/air mixture (or air alone) is compressed to the top of the combustion chambers by the pistons 38 moving upward, thereby reducing the volume of the combustion chambers. Towards the end of this movement, near top dead center, fuel is injected (if only air was present previously) and the fuel/air mixture is ignited, by a spark plug or by compressive self-ignition. When the ignited air/fuel mixture expands, the pistons 38 are pushed downwards, and this causes the expansion or power stroke that creates the engine power. The camshaft is in an angular orientation such that the cam lobes are not in contact with the rollers so as to not pivot the rocker arms or lift the valves 42 during the combustion stroke. During the exhaust stroke, the camshaft is in an angular orientation in which the cam lobes engage with the rollers associated with the exhaust valves, which are lifted from their seats. During the exhaust stroke, the pistons 38 are moved upward, forcing the gases that were created during the expansion or power stroke out of the combustion chambers through the exhaust valve openings after which the exhaust cam lobes are rotated until they no longer engage with the rollers so that the springs reseat the exhaust valves. The four-stroke cycle then repeats continuously during normal engine operation.

Fuel is delivered to the cylinders 36 in the aforementioned manner by a fuel delivery system 50 that includes a fuel pump 52 driven by engine power and a fuel injection assembly 54 through which the fuel pump 52 flows fuel routed through various fuel lines from a fuel tank (not shown). The fuel injection assembly includes a fuel rail 56 that may be a single rail member or an assembly of like or dissimilar rail members that define one or more hollow interior cavities or passages that are part of a fuel flow circuit joined by fuel lines 60. Coupled to the fuel rail 56 in the manner described below are an array of fuel injectors 58, typically one for each cylinder 36. The fuel injectors 58 are of conventional construction commercially available from various manufacturers, such as Denso Corporation of Kariya, Aichi, Japan. The fuel injectors 58 are in fluid communication with the internal cavities or passages of the fuel rail 56 and extend through injector cavities 62 in the cylinder head 32 that open to the combustion chambers of the cylinders 36. The fuel injectors 58 have spray nozzles 64 that meter a spray of fuel into the combustion chamber of each cylinder 36 in the volume and at the timing designated by the control system 24 to effect the repeated combustion cycle of the engine 16.

The fuel rail 56 and fuel injectors 58 are mounted to the engine 16, specifically, the cylinder head 32 thereof, by injector clamps 66, which in the illustrated example may be one injector clamp 66 for each fuel injector 58. As shown in FIGS. 3 and 4, the injector clamps 66 mount the fuel rail 56 so that it extends alongside, generally parallel to, the cylinder head 32. The fuel rail 56 is further mounted so that the array of fuel injectors 58, which are spaced apart along the fuel rail 56, align with and fit into the injector cavities 62 in the cylinder head 32. As shown in FIGS. 3 and 4, the injector cavities 62 and the fuel injectors 58 are oriented at non-orthogonal angles relative to, and intersecting, both the bottom and side planes of the cylinder head 32, that is the horizontal plane extending perpendicularly into the page in FIG. 3 and the vertical plane extending perpendicularly into the page in FIG. 4. Yet, as mentioned above and shown, the fuel rail 56 is aligned to extend in parallel to both of these planes of the cylinder head 32. As noted above, this mounting configuration of the fuel rail 56 and the fuel injectors 58 is afforded by the compound mounting surfaces of the injector clamps 66, which will be described now it detail with respect to an example implementation shown in FIGS. 5-8.

In the illustrated example, the fuel rail 56 is an assembly of two generally elongated rectangular tubular rail bodies 70. Each rail body 70 has multiple inlet ports 72, multiple injection ports 74, and a fuel channel 76. At each inlet port 72 is a fitting for coupling a fuel line 60, one being routed from the fuel pump 52 to an inlet port 72 of the first rail body 70 and another jumping from an inlet port 72 of the first rail body to an inlet port 72 of the second rail body 70. In this way, fuel may flow under pressure from the fuel pump 52 through the fuel lines 60, the inlet ports 72, and the internal fuel channels 76 to the injection ports 74. Since in the example implementation described herein the engine 16 is of an inline six cylinder configuration, the two rail bodies 70 each have three injection ports 74, one for each of six fuel injectors 58, as shown in FIG. 2.

As noted, the injector clamps 66 could vary in configuration provided the dimensioning is coordinated to provide the above-described mounting orientations and alignment of the fuel rail 56 and the fuel injectors 58. However, in the example implementations described herein, each of the fuel injectors 58 is mounted by an injector clamp 66 of identical configuration. As such, only one injector clamp 66 will be detailed herein.

Figure 6:
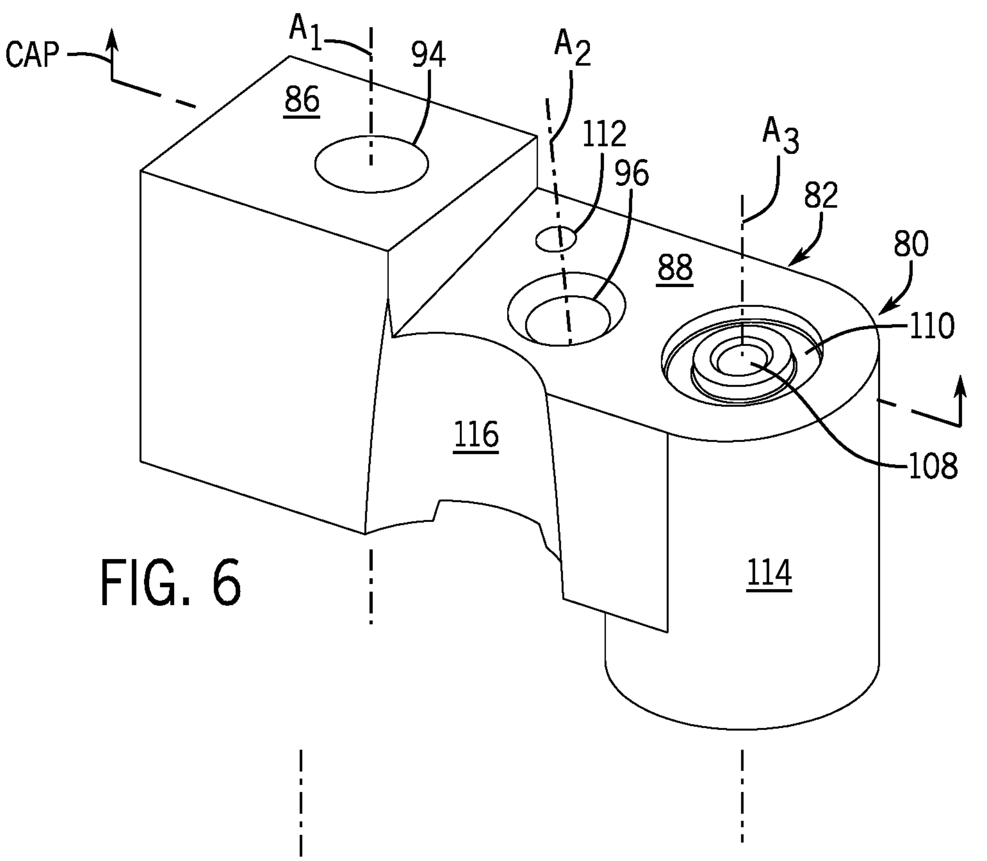
FIGS. 6 and 7 are perspective views of an example fuel injector clamp.
Figure 7:
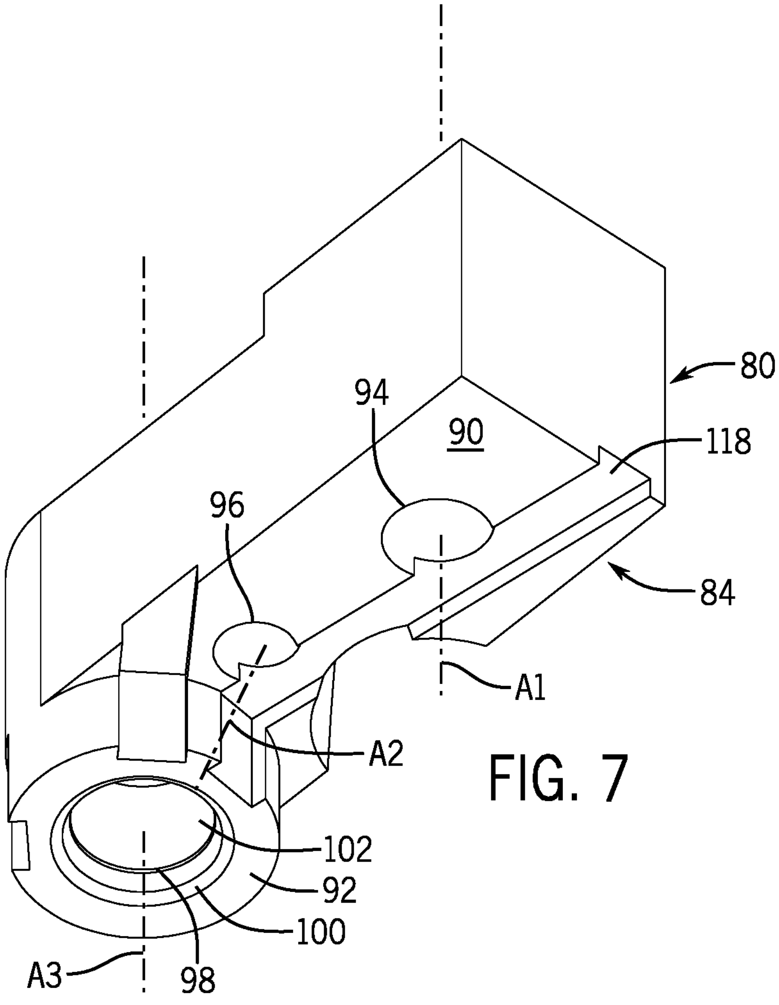
Figure 8:
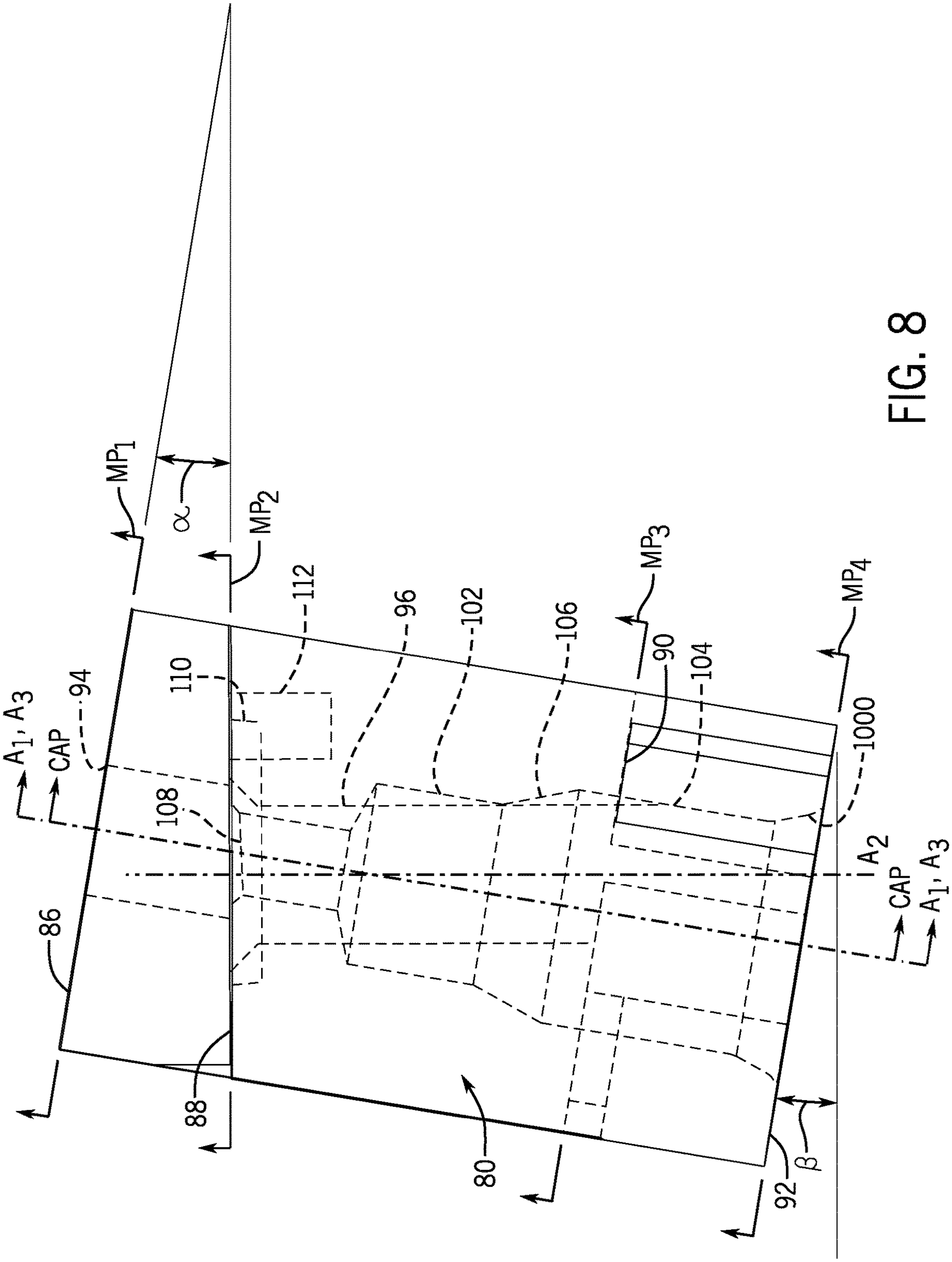
FIG. 8 is an elevational view depicting the compound angles thereof.

In the illustrated example of FIGS. 6-8, the injector clamp 66 has a clamp body with a fuel rail side 82 and a cylinder head side 84. The fuel rail side 82 defines a bolt fixing surface 86 that extends in a first mounting plane $MP_1$ and defines a rail mounting surface 88, that extends in an offset oblique second mounting plane $MP_2$ relative to the first mounting plane $MP_1$. The cylinder head side 84 defines a clamp mounting surface 90 that extends in a third mounting plane $MP_3$ that is offset from and parallel to the first plane $MP_1$ and defines an injector mounting surface 92 that extends in a fourth mounting plane $MP_4$ that is offset from and parallel to the first and third mounting planes $MP_1$, $MP_3$.

The clamp body 80 also defines a first bolt bore 94, a second bolt bore 96, and an injector pocket 98. The first bolt bore 94 extends through the clamp body 80 from the bolt fixing surface 86 at the fuel rail side 82 to the clamp mounting surface 90 at the cylinder head side 84 along an axis $A_1$ that is perpendicular to the first and third mounting planes $MP_1$, $MP_3$. The second bolt bore 96 extends through the clamp body from the rail mounting surface 88 at the fuel rail side 82 to the clamp mounting surface 90 along an axis $A_2$. Axis $A_2$ lies within an axial plane that is parallel to that in which axis $A_1$ lies, but within that axial plane it is in an obliquely angled orientation relative to that of axis $A_1$ such that axis $A_2$ extends perpendicularly to the second mounting plane $MP_2$ and is obliquely angled relative to the third mounting plane $MP_3$.

The clamp body 80 protrudes beyond the clamp mounting surface 90 in the region of the injector mounting surface 92 such that the clamp mounting surface 90 and the injector mounting surface 92 are offset axially but parallel to one another. The axis $A_2$ is perpendicular to the clamp mounting surface 90 and the injector mounting surface and parallel to the axis $A_1$. The injector pocket 98 extends through the clamp body along an axis $A_3$ that lies within another axial plane that is parallel to and offset from the axial planes of axes $A_1$ and $A_2$. Axis $A_3$ lies within its axial plane parallel to axis $A_1$ (and at an obliquely angled orientation relative to that of axis $A_2$) such that axis $A_3$ extends orthogonally to the third mounting plane $MP_3$ and is obliquely angled relative to the second mounting plane $MP_2$. Further, the axes $A_1$ and $A_3$ lie within a common axial plane CAP (that is orthogonal to the mounting planes $MP_1$, $MP_3$, $MP_4$ and the other axial planes mentioned above). The axis $A_2$ intersects but otherwise is oriented at an oblique angle relative to such a common axial plane CAP.

In the illustrated example, the clamp body 80 thus has flat or broad mounting surfaces that generally lie within four mounting planes of which three are axially offset and parallel ($MP_1$, $MP_3$, $MP_4$) and one ($MP_2$) is offset and obliquely angled relative to the other mounting planes ($MP_1$, $MP_3$, $MP_4$). The first mounting plane $MP_1$ and the second mounting plane $MP_2$ form an acute angle $\alpha$ therebetween, for example, 5-15 degrees, and in one particular example 9.5 degrees. It should be noted that the mounting planes $MP_1$-$MP_4$ are shown in FIGS. 6-8 as generally lateral or horizontal planes by virtue of their orientation on the page. And further, the aforementioned axial planes in which the axes $A_1$-$A_3$ lie may be considered generally upright or vertical planes, again due to their orientation on the page. However, the orientations of these planes are taken relative to the engine 16 (or cylinder head 32 thereof), and may be orientated at any angle relative to the horizon when the disclosed invention is practiced.

One such example may have the clamp bodies 80 canted at a small angle ß representing the insertion angle of the fuel injectors 58 which may be, for example, 10-16 degrees, and in one particular example may be 12 degrees.

It is also noted that the first bolt bore 94 intersects the bolt fixing surface 86 (and not the rail mounting surface 88) at the fuel rail side 82 of the clamp body 80, and the second bolt bore 96 intersects the clamp mounting surface 90 (but not the injector mounting surface 92) at the cylinder head side 84 of the clamp body 80. Moreover, in the illustrated example, the first bolt bore 94 is an unthreaded cylindrical through-bore, and the second bolt bore 96 is a threaded through-bore. In other embodiments, the first bolt bore 94 may also be threaded and the second bolt bore 96 may be a dead-headed bore that does not extend through the clamp body 80 entirely to intersect the clamp mounting surface 90.

The clamp body 80 is configured so that the injector pocket 98 can accommodate and secure the physical aspects of the fuel injector 58 as well as provide fluid communication to the fuel injector 58 from the fuel rail 56. To this end, the injector pocket 98 has an enlarged diameter outlet end 100 at the cylinder head side 84 that is concentric with the axis $A_3$ and contoured in a like manner (or at least to accommodate) the exterior geometry of the outer end of the fuel injector 58 opposite the spray nozzle 64. In the illustrated embodiment, the injector pocket 98 has a first annular section 102 of cylindrical configuration and a second annular section 104 of cylindrical configuration with an intermediate transition region 106 of frustoconical configuration extending from the first annular section 102 to the second annular section 104. The clamp body 80 is also configured so that the injector pocket 98 has an inlet opening 108 at the fuel rail side 82 that is also concentric with the axis $A_3$ and open to the enlarged outlet end 100. The inlet opening 108 has a nominal diameter that is lesser than the nominal diameter of the enlarged outlet end 100, including that of the first annular section 102, the second annular section 104, and the transition region 106. The clamp body 80 also defines at the fuel rail side 82 an annular seal recess 110 centric with the axis $A_3$ about the inlet opening 108.

The clamp body 80 also defines at the fuel rail side 82 a pin recess 112 in which a locating pin (e.g., a dowel) pin (not shown) may be inserted to aid in the assembly of the injector clamp 66 to the fuel rail 56. The pin recess 112 may be a dead-headed opening or a through-bore and is located outside of the common axial plane CAP. One end of the locating pin may be received in the pin recess 112 and the opposite end may be received in a corresponding opening (not shown) in the rail body 70. This arrangement provides an additional connection point (again out of alignment with the common axial plane CAP) that inhibits relative rotation of the injector clamp 66 and the rail body 70.

In addition, the clamp body 80 may define various other features and have an overall configuration that aids in placement of the injector clamp 66 in close physical proximity to the fuel injection assembly 54 and the engine 16. Various features, such as the narrow, elongated overall dimension and flat sides with a rounded end 114, the semi-cylindrical side cut-out 116, and the channel 118 at the cylinder head side 84, may be provided to accommodate the physical aspects of other components of the fuel injection assembly 54, the engine 16, and various lines, hoses, or other components connected thereto.

The process of assembling the fuel injection assembly 54 and installing it into an engine application may be undertaken in various ways or in various orders of assembly. Referring again to FIGS. 3-5, in one assembly process, the fuel injectors 58 are installed into the engine 16 by inserting the spray nozzles 64 of the fuel injectors 58 into the injector cavities 62 of the cylinder head 32. With the fuel injectors 58 in place, they are secured by the injector clamps 66. The outer ends of the fuel injectors are inserted into the injector pockets 98, and bolts 120 are inserted through the first bolt bore 94 of each clamp body 80. The bolts 120 are then threaded into the available threaded bores in the cylinder head 32. Securing these bolts 120 will secure the fuel injectors 58, seating additional seals (not shown) thereon against mating surfaces of the injector cavities 62. Then, annular seals (e.g., O-rings) (not shown) and locator pins (e.g., dowel pins) (not shown) may be placed into the seal recess 110 and the pin recess 112, respectively, at the fuel rail side 82 of each clamp body 80. The rail bodies 70 are then placed onto the injector clamps 66 and secured by additional bolts 120 fit through bolt holes 122 (one shown) in the rail bodies 70 and threaded into the second bolt bores 96 in the injector clamps 66. Securing the bolts 120 will bring the rail mounting surface 88 of each clamp body 80 into physical abutting relation with the broad surface of the rail body 70 and will seat the seals between the rail body 70 and the clamp bodies 80 to create a liquid tight seal around the inlet openings 108 of the injector pockets 98. The fuel pump 52 may be separately installed onto or near the engine 16, and the various fuel lines 60 from the fuel pump 52 may be connected to the fuel rail 56 and between the rail bodies 70. It may also be advantageous to assemble the fuel injection assembly 54, or portions of it (e.g., the fuel lines 60 to the rail bodies 70, the injector clamps 66 to the fuel rail 56, and/or the fuel injectors 58 to the injector clamps 66) so that the fuel injection assembly 54 (or portions thereof) may be assembled onto the engine 16 as a unit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

Accordingly, various embodiments and implementations other than those explicitly described are within the scope of the following claims.

What is claimed is:

1. A fuel injector clamp comprising:

a fuel rail side including a bolt fixing surface extending in a first plane and a rail mounting surface extending in an oblique second plane relative to the first plane;

a cylinder head side including a clamp mounting surface extending in a third plane parallel to the first plane; and a clamp body extending between the fuel rail side and the cylinder head side and defining a first bolt bore, a second bolt bore, and an injector pocket, wherein the first bolt bore extends from the bolt fixing surface at the fuel rail side through the clamp body to the cylinder head side perpendicular to the bolt fixing surface and the clamp mounting surface, wherein the second bolt bore extends from the rail mounting surface at the fuel rail side into the clamp body perpendicular to the rail mounting surface, and wherein the injector pocket extends through the clamp mounting surface perpendicularly through the clamp body to the rail mounting surface, the first bolt bore and the injector pocket extending along parallel axes and the second bolt bore extending along an axis that is oblique to the parallel axes.

2. The fuel injector clamp of claim 1, wherein the second bolt bore is a threaded bore.

3. The fuel injector clamp of claim 1, wherein the second bolt bore intersects the clamp mounting surface at the cylinder head side.

4. The fuel injector clamp of claim 3, wherein the cylinder head side includes a flat surface parallel to and offset from the clamp mounting surface and intersected by the injector pocket.

5. The fuel injector clamp of claim 4, wherein the injector pocket has a first diameter at the fuel rail side and a second diameter at the cylinder head side, the second diameter being larger than the first diameter.

6. The fuel injector clamp of claim 5, wherein the fuel rail side defines an annular seal recess about the injector pocket.

7. The fuel injector clamp of claim 5, wherein the injector pocket has an intermediate transition region between the fuel rail side and the cylinder head side that has a frustoconical configuration.

8. The fuel injector clamp of claim 7, wherein the injector pocket has a first annular section of cylindrical configuration and a second annular section of cylindrical configuration, the transition region extending from the first annular section to the second annular section.

9. The fuel injector clamp of claim 1, wherein the first plane and the second plane form an acute angle therebetween.

10. A fuel injection assembly for an engine of a work vehicle, the assembly comprising:

- a fuel rail having an inlet port, an injection port, and a fuel channel for delivering fuel from the inlet port to the injection port;
- a fuel injector having a spray nozzle; and
- a fuel injector clamp configured to couple the fuel rail and the fuel injector together and to a cylinder head of the engine;
- wherein the fuel injector clamp defines a clamp body having a bolt fixing surface extending in a first plane, a rail mounting surface extending in a second plane that is oblique relative to the first plane, and a clamp mounting surface extending in a third plane parallel to the first plane opposite the rail mounting surface;
- wherein the clamp body defines a first bolt bore, a second bolt bore, and an injector pocket, wherein the first bolt bore extends from the bolt fixing surface perpendicularly through the clamp body to the clamp mounting surface, the second bolt bore extends from the rail mounting surface perpendicularly into the clamp body, and the injector pocket extends through the clamp mounting surface perpendicularly through the clamp body to the rail mounting surface, the first bolt bore and the injector pocket extending along parallel axes and the second bolt bore extending along an axis that is oblique to the parallel axes; and
- wherein the fuel injector clamp couples to the cylinder head via a first bolt extending through the first bolt bore and to the fuel rail via a second bolt extending into the second bolt bore, and wherein the fuel injector clamp clamps the fuel injector into and between the injector pocket and an injector cavity of the cylinder head so that fuel from the fuel rail may be sprayed from the spray nozzle.

11. The assembly of claim 10, wherein the second bolt bore is a threaded bore.

12. The assembly of claim 10, wherein the injector pocket has a first diameter at the rail mounting surface and a second diameter at the clamp mounting surface, the second diameter being larger than the first diameter.

13. The assembly of claim 12, wherein the rail mounting surface encircles an annular seal recess about the injector pocket.

14. The assembly of claim 13, wherein the injector pocket has an intermediate transition region between the rail mounting surface and the clamp mounting surface that has a frustoconical configuration.

15. The assembly of claim 14, wherein the injector pocket has a first annular section of cylindrical configuration and a second annular section of cylindrical configuration, the transition region extending from the first annular section to the second annular section.

16. The assembly of claim 10, wherein the first plane and the second plane form an acute angle therebetween.

17. An engine for a work vehicle comprising:

- an engine block crankcase;
- a cylinder head mounted to the engine block crankcase and defining a piston cylinder and an injector cavity open to the piston cylinder; and
- a fuel injection assembly mounted to the cylinder head and including:
  - a fuel rail having an inlet port, an injection port, and a fuel channel for delivering fuel from the inlet port to the injection port;
  - a fuel injector having a spray nozzle; and
  - a fuel injector clamp configured to couple the fuel rail and the fuel injector together and to the cylinder head;
  - wherein the fuel injector clamp defines a clamp body having a bolt fixing surface extending in a first plane, a rail mounting surface extending in a second plane that is oblique relative to the first plane, and a clamp mounting surface extending in a third plane parallel to the first plane opposite the rail mounting surface;
  - wherein the clamp body defines a first bolt bore, a second bolt bore, and an injector pocket, wherein the first bolt bore extends from the bolt fixing surface perpendicularly through the clamp body to the clamp mounting surface, the second bolt bore extends from the rail mounting surface perpendicularly into the clamp body, and the injector pocket extends through the clamp mounting surface perpendicularly through the clamp body to the rail mounting surface, the first bolt bore and the injector pocket extending along parallel axes and the second bolt bore extending along an axis that is oblique to the parallel axes; and
  - wherein the fuel injector clamp couples to the cylinder head via a first bolt extending through the first bolt bore and to the fuel rail via a second bolt extending into the second bolt bore, and wherein the fuel injector clamp clamps the fuel injector into and between the injector pocket and the injector cavity of the cylinder head so that fuel from the fuel rail may be sprayed from the spray nozzle into the piston cylinder.

18. The engine of claim 17, wherein the second bolt bore is a threaded bore.

19. The engine of claim 17, wherein the injector pocket has a first diameter at the rail mounting surface and a second diameter at the clamp mounting surface, the second diameter being larger than the first diameter; and

- wherein the rail mounting surface encircles an annular seal recess about the injector pocket.

20. The engine of claim 19, wherein the injector pocket has an intermediate transition region between the rail mounting surface and the clamp mounting surface that has a frustoconical configuration; and wherein the injector pocket has a first annular section of cylindrical configuration and a second annular section of cylindrical configuration, the transition region extending from the first annular section to the second annular section.

* * * * *